US012682089B2

(12) United States Patent
Nakajima

(10) Patent No.: US 12,682,089 B2
(45) Date of Patent: Jul. 14, 2026

(54) INFORMATION MANAGEMENT SYSTEM AND INFORMATION MANAGEMENT METHOD

(71) Applicant: Hitachi High-Tech Corporation, Tokyo (JP)

(72) Inventor: Aika Nakajima, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 118 days.

(21) Appl. No.: 18/713,243

(22) PCT Filed: Nov. 7, 2022

(86) PCT No.: PCT/JP2022/041367
§ 371 (c)(1),
(2) Date: May 24, 2024

(87) PCT Pub. No.: WO2023/127312
PCT Pub. Date: Jul. 6, 2023

(65) Prior Publication Data
US 2024/0338468 A1     Oct. 10, 2024

(30) Foreign Application Priority Data
Dec. 27, 2021     (JP) ................................. 2021-213308

(51) Int. Cl.
*G06F 21/62*       (2013.01)
*G06F 21/00*       (2013.01)
*G06F 21/55*       (2013.01)

(52) U.S. Cl.
CPC .............. *G06F 21/62* (2013.01); *G06F 21/55* (2013.01)

(58) Field of Classification Search
CPC ........ G06F 21/62; G06F 21/55; G06F 21/554; G06F 21/577; G06F 21/604; G06F 21/629; G06F 21/121
See application file for complete search history.

(56) References Cited

U.S. PATENT DOCUMENTS

2004/0128557 A1     7/2004   Sakushima et al.
2007/0250920 A1*   10/2007   Lindsay .................. G06F 21/31
                                                              726/7

FOREIGN PATENT DOCUMENTS

JP          2004-126737  A      4/2004
JP          2006-195669  A      7/2006
(Continued)

OTHER PUBLICATIONS

International Search Report (PCT/ISA/210) issued in PCT Application No. PCT/JP2022/041367 dated Jan. 24, 2023 with English translation (5 pages).

(Continued)

*Primary Examiner* — Edward Zee
(74) *Attorney, Agent, or Firm* — Crowell & Moring LLP

(57) ABSTRACT

The objective of the present invention is to achieve both information security and user convenience in an information management system that manages information related to an automated analyzer, even if conditions of unauthorized use from a remote terminal occur. An information management system according to the present invention, upon detecting a communication disconnection or conditions of unauthorized use from a remote terminal, performs one or both of issuing a warning to an administrator or lowering the level of access rights, and enables access to at least a portion of the information even if the level of access rights is lowered.

14 Claims, 9 Drawing Sheets

(56)                    References Cited

FOREIGN PATENT DOCUMENTS

| JP | 2008-90469 A | 4/2008 |
| JP | 2009-80560 A | 4/2009 |
| JP | 2010-55297 A | 3/2010 |
| WO | WO 02/03215 A1 | 1/2002 |

OTHER PUBLICATIONS

Japanese-language Written Opinion (PCT/ISA/237) issued in PCT Application No. PCT/JP2022/041367 dated Jan. 24, 2023 with English translation (8 pages).
Japanese-language International Preliminary Report on Patentability (PCT/IPEA/409) issued in PCT Application No. PCT/JP2022/041367 dated May 30, 2023, including Annexes with partial English translation (20 pages).

* cited by examiner

FIG. 3

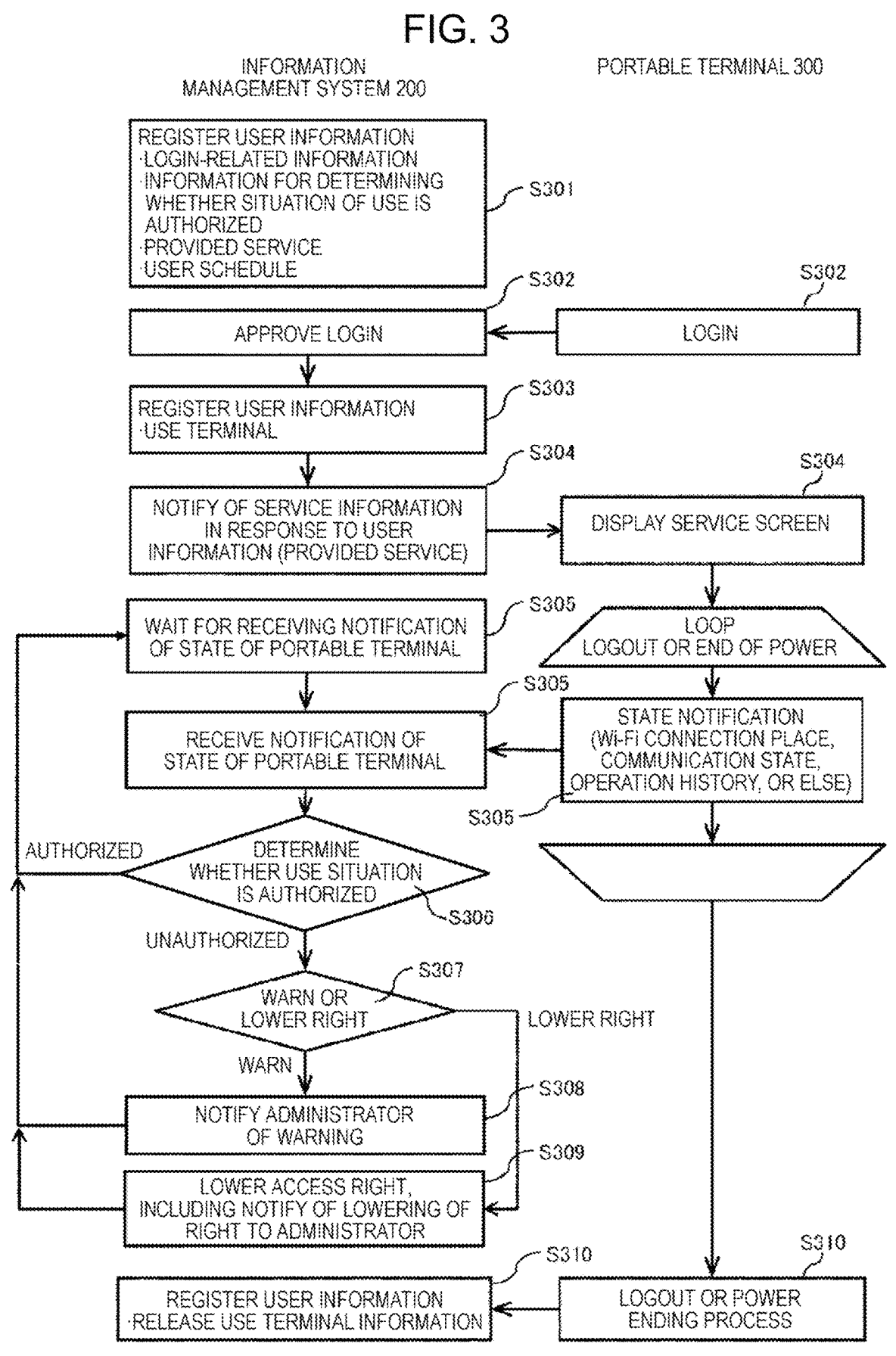

INFORMATION
MANAGEMENT SYSTEM 200

PORTABLE TERMINAL 300

REGISTER USER INFORMATION
·LOGIN-RELATED INFORMATION
·INFORMATION FOR DETERMINING
 WHETHER SITUATION OF USE IS
 AUTHORIZED
·PROVIDED SERVICE
·USER SCHEDULE — S301

S302

S302

APPROVE LOGIN ← LOGIN

S303

REGISTER USER INFORMATION
·USE TERMINAL

S304

S304

NOTIFY OF SERVICE INFORMATION
IN RESPONSE TO USER
INFORMATION (PROVIDED SERVICE) → DISPLAY SERVICE SCREEN

S305

WAIT FOR RECEIVING NOTIFICATION
OF STATE OF PORTABLE TERMINAL

LOOP
LOGOUT OR END OF POWER

S305

S305

RECEIVE NOTIFICATION OF
STATE OF PORTABLE TERMINAL ← STATE NOTIFICATION
(Wi-Fi CONNECTION PLACE,
COMMUNICATION STATE,
OPERATION HISTORY, OR ELSE)

S305

AUTHORIZED ← DETERMINE
WHETHER USE SITUATION
IS AUTHORIZED

S306

UNAUTHORIZED

S307

WARN OR
LOWER RIGHT → LOWER RIGHT

WARN

S308

NOTIFY ADMINISTRATOR
OF WARNING

S309

LOWER ACCESS RIGHT,
INCLUDING NOTIFY OF LOWERING OF
RIGHT TO ADMINISTRATOR

S310

S310

REGISTER USER INFORMATION
·RELEASE USE TERMINAL INFORMATION ← LOGOUT OR POWER
ENDING PROCESS

FIG. 4

<LOGIN INFORMATION TABLE>

| NAME | USER ID | PASSWORD | RIGHT |
|---|---|---|---|
| TARO YAMADA | 123456 | XXXXXXXX | ADMINISTRATOR |
| HANAKO SUZUKI | 012345 | XXXXXXXX | GENERAL |
| BIOCHEMISTRY Gr. | 901234 | XXXXXXXX | LOWEST LEVEL |

<PORTABLE TERMINAL TABLE>

| TERMINAL ID | USER ID | CONNECTION STATE | Wi-Fi AREA | ACCESS RIGHT STATE | OPERATION HISTORY |
|---|---|---|---|---|---|
| A | 123456 | YES | AREA 1 | ADMINISTRATOR | [TIME] - [CONTENT] ··· |
| B | UNAVAILABLE | NO | - | - | [TIME] - [CONTENT] ··· |
| C | 012345 | YES | AREA 2 | LEVEL LOWERED | [TIME] - [CONTENT] ··· |

<INFORMATION ITEM TABLE>

| USER ID | TARGET DEVICE | AREA | DEVICE INFORMATION | PATIENT INFORMATION | LABORATORY INFORMATION | SCHEDULE | POSTING CALL | CONDITION EDITING |
|---|---|---|---|---|---|---|---|---|
| 123456 | NO. 1 TO 4 DEVICE | A,B | ○ | ○ | ○ | ○ (ALL) | ○ | ○ (ALL) |
| 012345 | NO. 3, 4 DEVICE | A | ○ | ○ | × | ○ (INDIVIDUAL) | ○ | ○ (INDIVIDUAL) |

<ACCESS RIGHT TABLE>

| INFORMATION | DEVICE INFORMATION | PATIENT INFORMATION | LABORATORY INFORMATION | SCHEDULE | POSTING CALL | CONDITION EDITING |
|---|---|---|---|---|---|---|
| ACCESS RIGHT | UNNECE-SSARY | GENERAL AND ADMINISTR-ATOR | ADMINIST-RATOR | ADMINISTRATOR : ALL OTHERS : ONLY OWN | GENERAL AND ADMINISTRATOR | ADMINIST-RATOR |

FIG. 5A

| CONDITIONS | OPTIONS |
|---|---|
| ONLINE CONDITION | UNDESIGNATED / ONLINE / OFFLINE / OFFLINE DURATION TIME |
| ACCESS STATE | UNDESIGNATED / UNOPERATED DURATION TIME |
| AREA CONDITION | UNDESIGNATED / OUT OF AREA / SPECIFIC AREA NUMBER DESIGNATION |
| TERMINAL CONDITION | ALL TERMINALS / TERMINAL ID DESIGNATION / PLURALITY OF TERMINALS OF SAME USER ARE IN CONNECTION STATE AND AREA DEVIATION |
| USER CONDITION | ALL/DESIGNATED USER ID |
| USER STATE | UNDESIGNATED / VACATION / DURING MEETING / DURING ROUTINE WORK / DURING MAINTENANCE / WORKING TIME |
| OPERATION STATE | UNDESIGNATED / OTHER THAN REGISTRATION SERVICE / INQUIRY TARGET DEVICE / DEVICE INFORMATION NOTIFICATION / DEVICE INFORMATION INQUIRY / PATIENT INFORMATION NOTIFICATION / PATIENT INFORMATION INQUIRY / LABORATORY SITUATION NOTIFICATION / LABORATORY SITUATION INQUIRY / MESSAGE POSTING/CALL / SCHEDULE AND SERVICE PROVIDING CONDITION EDITING OR ELSE |

FIG. 5B

| CATEGORY | PROCESS EXECUTED WHEN DETECTING UNAUTHORIZED SITUATION |
|---|---|
| TERMINAL PROCESS | UNDESIGNATED / DESIGNATION DATA DELETION / WARNING DISPLAY / LOWERING OF LOGIN LEVEL |
| ADMINISTRATOR TERMINAL PROCESS | UNDESIGNATED / WARNING DISPLAY / NOTIFICATION OF MESSAGE TO TERMINAL / LOWERING OF TERMINAL LOGIN LEVEL MANUALLY |

FIG. 5C

| FACILITY | RULE DESCRIPTION | CONDITION | PROCESS IN CONTRADICTION |
|---|---|---|---|
| A (FACILITY WHICH CANNOT BE USED AND TAKEN OUT IN COMMUNICATION-DISABLED AREA | UNABLE TO BE TAKEN IN TO OTHER AREAS OR OFFLINE | (1) OFFLINE STATE (2) Wi-Fi AREA CONNECTION UNPERMITTED FOR TERMINAL ID | ALERT TO ADMINISTRATOR TERMINAL DELETE TERMINAL DATA LOWER LOGIN LEVEL |
| B (MANY AREAS WHERE COMMUNICATION IS DISABLED IN ACTION RANGE, AUTHORIZED OPERATION LOGIN IS CONTINUED) | RETAINED WHEN AUTHORIZED OPERATION CONTINUES IN OFFLINE AREA | (1) OFFLINE STATE AND UNOPERATED TIMEOUT (XXX SECONDS) (2) OFFLINE STATE AND OPERATION OF CONFIRMING REAGENT INFORMATION OR CONFIRMING PATIENT INFORMATION OF ALERT INFORMATION (3) OFFLINE STATE AND OPERATION OTHER THAN (2) | (1), (3) ALERT TO ADMINISTRATOR TERMINAL DELETE TERMINAL DATA LOWER LOGIN LEVEL (2) NO COUNTERMEASURE |
| C (SETTING FOR INDIVIDUALS WHEN MANY PEOPLE SUCH AS PART-TIME WORKERS WORK) | RULE OTHER THAN LABORATORY TECHNICIAN | (1) DESIGNATE USER ID OTHER THAN LABORATORY TECHNICIAN AND SET OFFLINE STATE OR UNOPERATED TIMEOUT CONDITION (STRICT SETTING) (2) DESIGNATE USER ID OTHER THAN LABORATORY TECHNICIAN AND MEASUREMENT RESULT VIEWING NUMBER OTHER THAN ALARM OCCURRENCE TIME IS X TIMES (PERSONAL INFORMATION OF ID OR PATIENT NAME IS MASKED) | (1) ALERT TO ADMINISTRATOR TERMINAL DELETE TERMINAL DATA LOWER LOGIN LEVEL (2) ALERT TO ADMINISTRATOR TERMINAL |

FIG. 7

| TERMINAL | ONLINE | LOGIN | ACCESS RIGHT | LATEST USE HISTORY | MESSAGE |
|---|---|---|---|---|---|
| A | ◯ (AREA 1) | MANAGER A (ROUTINE WORK) | LOWEST LEVEL | 12:50 NO. 2 DEVICE ALARM RECEPTION | |
| B | ✕ | MANAGER B (DURING MEETING) | MAINTENANCE RIGHT | 13:00 NO. 1 DEVICE REAGENT LIST ACQUISITION | |
| C | ◯ (AREA 1) | MANAGER A (ROUTINE WORK) | LOWEST LEVEL | 12:50 NO. 2 DEVICE ALARM RECEPTION | |
| D | ◯ (AREA 2) | MANAGER C (OFF WORK TIME) | ADMINISTRATOR | 13:05 PATIENT MEASUREMENT RESULT LIST ACQUISITION | WARNING |
| E | ✕ | NO | | | |

FIG. 8

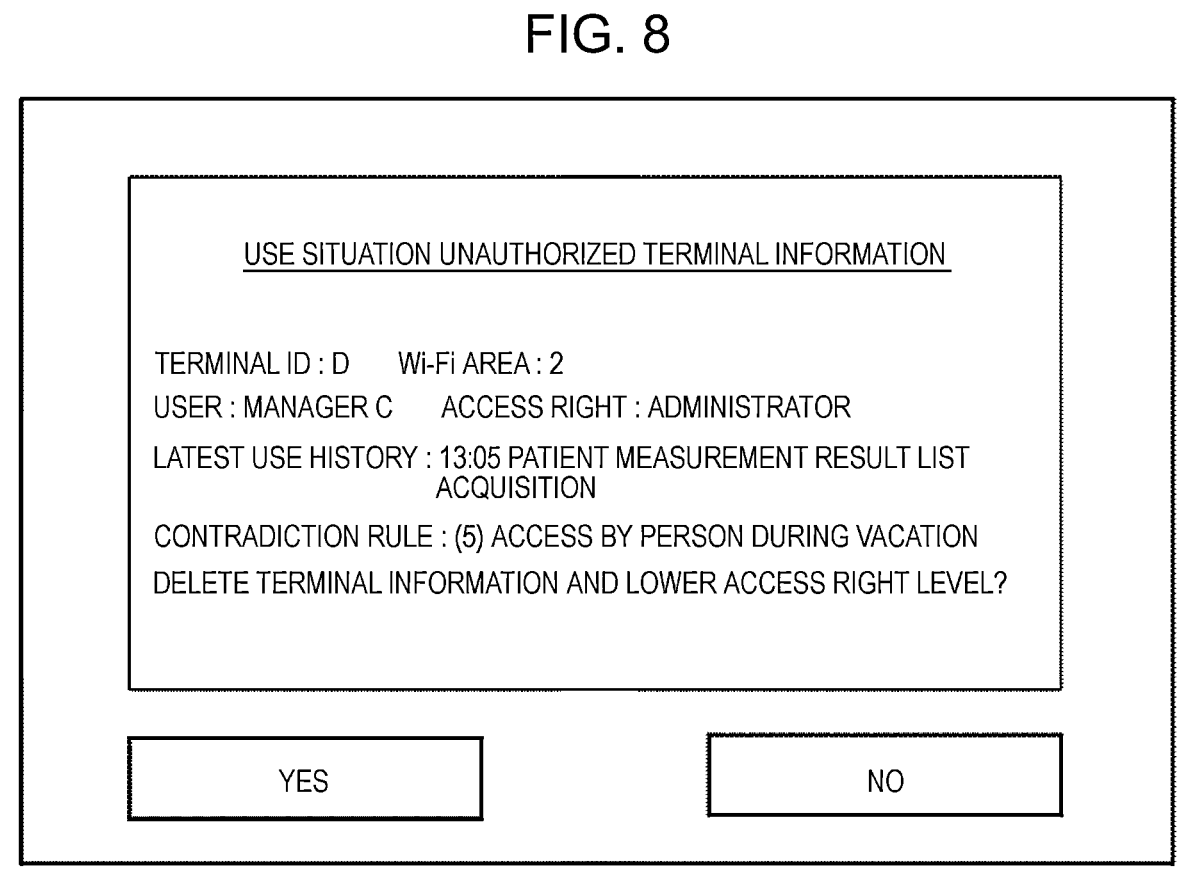

USE SITUATION UNAUTHORIZED TERMINAL INFORMATION

TERMINAL ID : D     Wi-Fi AREA : 2

USER : MANAGER C     ACCESS RIGHT : ADMINISTRATOR

LATEST USE HISTORY : 13:05 PATIENT MEASUREMENT RESULT LIST
                     ACQUISITION

CONTRADICTION RULE : (5) ACCESS BY PERSON DURING VACATION

DELETE TERMINAL INFORMATION AND LOWER ACCESS RIGHT LEVEL?

| YES | NO |
|-----|-----|

INFORMATION MANAGEMENT SYSTEM AND INFORMATION MANAGEMENT METHOD

TECHNICAL FIELD

The present invention relates to an information management system that provides data describing information regarding an automated analyzer to a remote terminal.

BACKGROUND ART

An automated analyzer is a device that analyzes components or the like of a sample. Information regarding the automated analyzer (for example, personal information of a subject providing a specimen or other types of information exemplified in embodiments to be described below) can be accessed from a remote terminal such as a portable terminal via, for example, a system that manages the information. In such an information management system, it is necessary to guarantee information security so that third parties cannot access personal information such as patient information.

As a technique of the related art, a technique is known capable of continuing accessing a system at a low access right level even if a portable terminal logs out from a system due to timeout or line disconnection when access to the system is made using the portable terminal. For example, PTL 1 discloses a technique related to such point although the technique is not a technique related to an automated analyzer. When an access right level is lowered automatically due to timeout or the like, it is general to take away an access right of a user, for example, by causing the user to log out. The literature discloses a technique for maintaining an access right at a lowest level even then and allowing the user to continue accessing data.

CITATION LIST

Patent Literature

PTL 1: WO2002/003215A1

SUMMARY OF INVENTION

Technical Problem

In a laboratory where an automated analyzer is installed, portable terminals such as smartwatches have been introduced. Accordingly, a security risk may increase and information management is required to be stricter.

There are various types of communication situations in a laboratory or work content of managers for each facility or manager. A laboratory technician can be out of a communication range in which communication with an information management system is possible due to work at a place such as a reagent refrigerator at which radio waves do not arrive or other in-between work in some cases. Alternatively, a laboratory technician automatically logs out from an information management system by timeout without operating a portable terminal for a given time in some cases.

As disclosed in PTL 1, even if a laboratory technician logs out from a system as such, only accessible information can be continuously provided by classifying and managing personal information or the like for each level in advance. Such a situation is considered to occur even when a use situation of a user terminal is unauthorized. For example, when an information management system detects a possibility of a use situation of a user terminal being unauthorized, it is considered that it is general to take away an access right level of the user. However, even if access is not unauthorized, a reauthorization step is required to access information again, which results in problems similar to those of PTL 1.

The present invention has been devised in view of the foregoing problems and an objective of the present invention is to achieve both information security and user convenience even if a situation of an unauthorized use of a remote terminal occurs in an information management system that manages information regarding an automated analyzer.

Solution to Problem

According to an aspect of the present invention, an information management system performs at least one of operations of issuing a warning to an administrator and lowering an access right level when disconnection of communication or a situation of unauthorized use of a remote terminal is detected, and enables access to at least part of information even when the access right level is lowered.

Advantageous Effects of Invention

The information management system according to the present invention can achieve both information security and user convenience by maintaining a certain access right level while lowering the access right level even if a situation of an unauthorized use of a remote terminal occurs.

BRIEF DESCRIPTION OF DRAWINGS

FIG. 3 is a diagram illustrating a processing procedure of a service allowing the information management system 200 to provide information regarding the automated analyzer 100 to a portable terminal 300.

FIG. 4 is a diagram illustrating examples of data and configurations of data tables retained in a storage medium 250.

FIG. 5A is a diagram illustrating examples of determination conditions and options configured in check rules used when it is determined in S306 whether a use situation of the portable terminal 300 is authorized.

FIG. 5B is a diagram illustrating examples of options of processes performed when a situation of unauthorized use of the portable terminal 300 is detected.

FIG. 5C is a diagram illustrating examples of actually configured check rules using the options of FIGS. 5A and 5B.

FIG. 7 is a diagram illustrating a management screen of the information management system 200.

FIG. 8 is a diagram illustrating an example of a screen interface for giving an instruction for countermeasures to the portable terminal 300 of which a use situation is unauthorized.

DESCRIPTION OF EMBODIMENTS

First Embodiment

Figure 1:
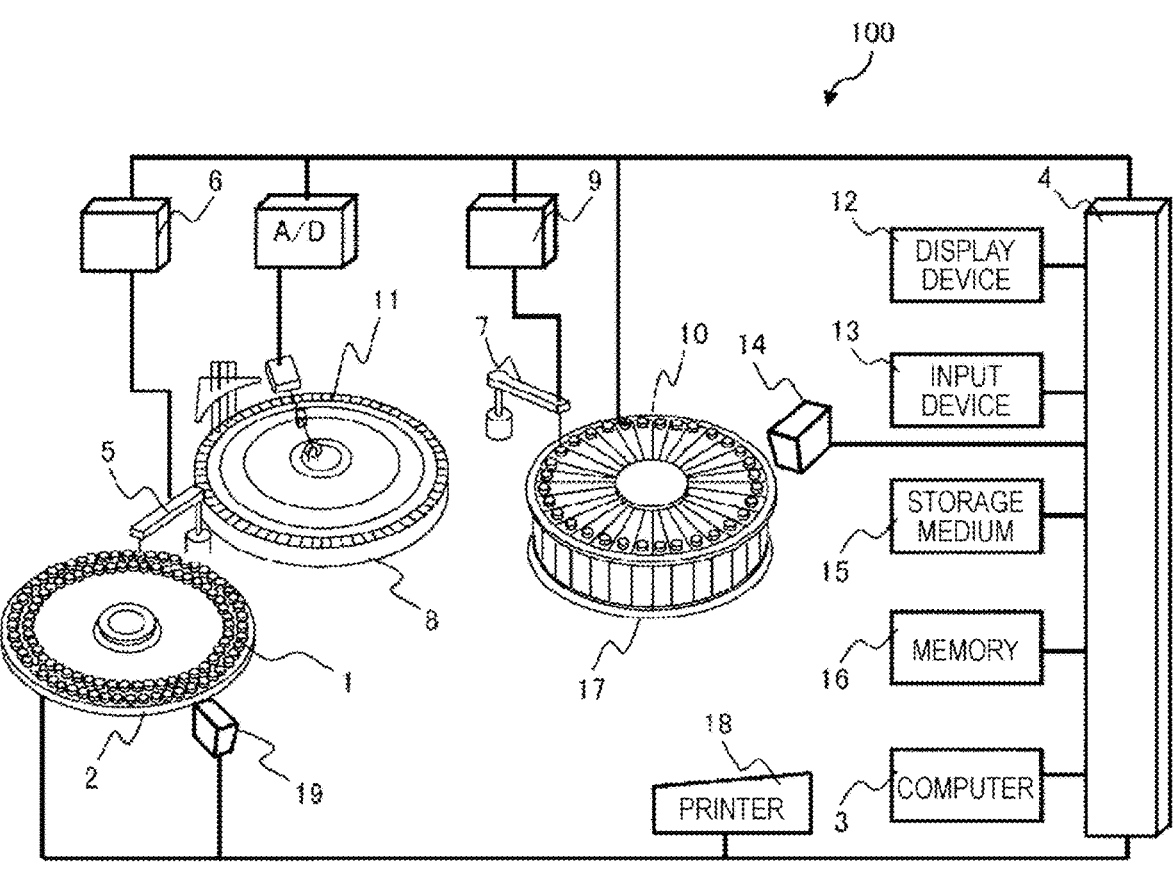
FIG. 1 is a diagram illustrating an outline of an overall configuration of an automated analyzer 100 according to a first embodiment.

FIG. 1 is a diagram illustrating an outline of an overall configuration of an automated analyzer 100 according to a first embodiment of the present invention. A specimen container 1 contains a specimen that is analyzed by the automated analyzer 100. A specimen movement mechanism 2 on which the specimen container 1 is loaded is rotated to move the specimen container 1. A specimen ID reader 19 reads a specimen ID printed on the surface of the specimen container 1. A specimen dispenser 5 dispenses the specimen contained in the specimen container 1 to a reaction container 11. A reagent container 10 contains a reagent that reacts to the specimen. A reagent storage 17 holds the reagent container 10. A reagent dispenser 7 dispenses the reagent to the reaction container 11. A liquid level detector 9 detects a liquid level inside the reagent container 10. A reagent ID reader 14 reads a reagent ID printed on the surface of the reagent container 10. A liquid level detector 6 detects a liquid level inside the reaction container 11. The reaction container 11 contains the specimen and the reagent so that the specimen and the reagent react with each other. A reaction container movement mechanism 8 on which the reaction container 11 is load is rotated to move the reaction container 11.

A microcomputer 3 controls an operation of the automated analyzer 100 by controlling each unit included in the automated analyzer 100. A display device 12 displays a result or the like processed by the microcomputer 3. An input device 13 is a device such as a mouse or a keyboard for inputting an operation instruction from a user. A storage medium 15 stores data or the like used by the microcomputer 3. A memory area 16 stores data or the like temporarily used by the microcomputer 3. A printer 18 prints a result or the like processed by the microcomputer 3 on a paper medium. An interface 4 connects each functional unit to each other.

The storage medium 15 stores information regarding patient specimens registered in the automated analyzer 100 or device maintenance information such as a device alarm, maintenance, and a reagent. The information includes (a) personal information such as a name, sex, and an age of a patient, a specimen ID, and patient information such as a measurement result and (b) non-patient information such as a reagent, maintenance, and an alarm. Whether such information is displayed is controlled according to an access right level of a login user. When access to personal information or patient information is made, a higher access right than that of non-patient information is required.

Figure 2:
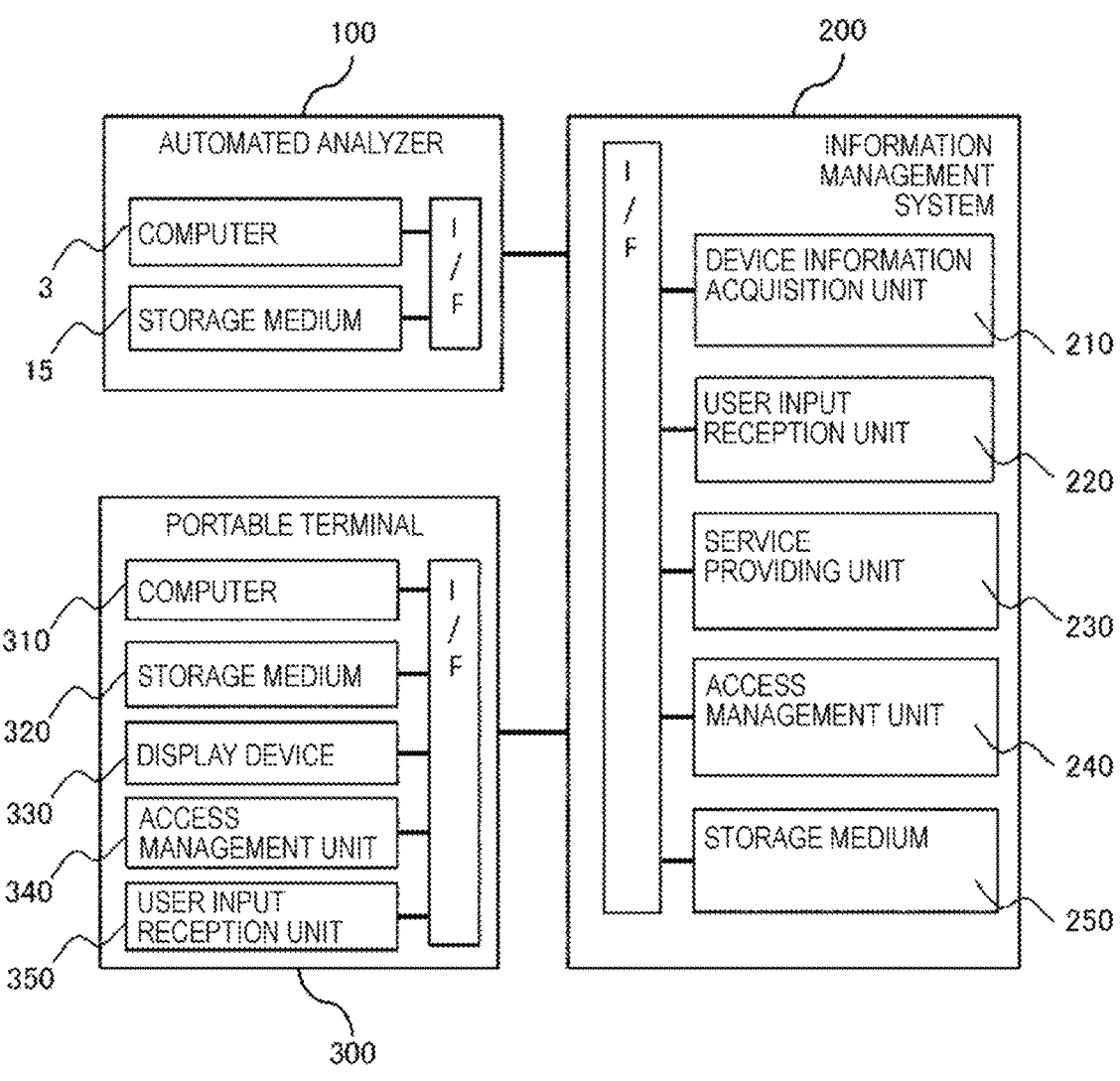
FIG. 2 is a diagram illustrating a configuration of an information management system 200.

FIG. 2 is a diagram illustrating a configuration of the information management system 200. The information management system 200 is a system that provides information regarding the automated analyzer 100 to the portable terminal 300 (remote terminal). The information management system 200 may be configured as a part of the automated analyzer 100 or may be configured as a separate system from the automated analyzer 100 and communicate with the automated analyzer 100. FIG. 2 illustrates an example in which the information management system 200 is configured as a separate system. The information management system 200 can be configured by a server computer or the like that includes each unit illustrated in FIG. 2.

The information management system 200 includes a device information acquisition unit 210, a user input reception unit 220, a service providing unit 230, an access management unit 240, and a storage medium 250. The device information acquisition unit 210 acquires information stored in the storage medium 15 of the automated analyzer 100. The user input reception unit 220 receives a user input such as a user ID, a password, a designation of a service requested to the information management system 200, and an operation instruction on a screen interface to be described below. The service providing unit 230 provides services to the portable terminal 300. The services mentioned here are (a) a function of presenting information regarding a state or the like of the automated analyzer 100, (b) a function of presenting personal information regarding a provider (a patient, a subject, or the like) of a specimen analyzed by the automated analyzer 100, and the like, and other specific examples will be described below. The access management unit 240 manages access to information that is provided by a service by the information management system 200. The details of an access management procedure will be described below. The storage medium 250 stores data describing information retained by the information management system 200.

The portable terminal 300 includes a computer 310, a storage medium 320, a display device 330, an access management unit 340, and a user input reception unit 350. The access management unit 340 can be mounted as, for example, a software module. The computer 310 manages access to information on the portable terminal 300 by performing the access management unit 340. The computer 310 also controls each unit included in the portable terminal 300. The storage medium 320 stores data describing information retained by the portable terminal 300. The display device 330 presents information regarding the automated analyzer 100 to the user by displaying information acquired from the information management system 200. The access management unit 340 manages access to information retained by the portable terminal 300. The user input reception unit 350 receives an operation instruction from the user on the portable terminal 300.

FIG. 3 is a diagram illustrating a processing procedure of a service allowing the information management system 200 to present information regarding the automated analyzer 100 to the portable terminal 300. Each step of FIG. 3 will be described below.

(FIG. 3: Step S301)

An administrator registers information regarding a user using the information management system 200 through the user input reception unit 220. User information registered in the current step is stored in the storage medium 250. For example, the following information is considered as user information.

(a) Login-related information such as a user ID and a password used by a user logging in the information management system 200.

(b) Information used to determine whether a situation when a user uses the portable terminal 300 and a situation when the information management system 200 is used through the portable terminal 300 is authorized (a check rule to be described below).

(c) Classification of a service to be provided to a user registered in the current step.

(d) A work schedule of the user registered in the current step.

(FIG. 3: Step S302)

The user performs a login operation through the user input reception unit 350 of the portable terminal 300. The access management unit 240 performs login authentication using a user ID, a password, and the like input by the user.

(FIG. 3: Step S303)

The access management unit 240 stores information for associating an ID of the portable terminal 300 with an ID of a user logging in S302 in the storage medium 250. Accordingly, it is possible to ascertain which user is using which portable terminal 300 in the information management system 200.

(FIG. 3: Step S303: Supplement)

Information for associating the portable terminal 300 and the user stored in the current step is retained in the storage medium 250 until an event occurs by which deletion is performed manually by the administrator (a specific example will be described below), logout is performed through the user input reception unit 350, and power of the portable terminal 300 ends. That is, a login state of the user in the information management system 200 is maintained.

(FIG. 3: Step S304)

The service providing unit 230 notifies the portable terminal 300 of the classification of the service that can be provided to the logged-in user according to the user information registered in S301. The computer 310 of the portable terminal 300 displays a service menu screen on the display device 330 according to the notification. The user can access information regarding the automated analyzer 100 provided by the information management system 200 through the service menu screen.

(FIG. 3: Step S304: Supplement)

The service providing unit 230 presents only information items permitted by an access right table (or information item table) to be described below in FIG. 4 to the portable terminal 300 in the current step. That is, even when services are permitted to be provided to the user, services that the user does not have an access right among information items referred to in the services are not presented to the portable terminal 300 by the service providing unit 230.

(FIG. 3: Step S305)

The information management system 200 waits for receiving a terminal use state from the portable terminal 300. The portable terminal 300 (the computer 310) periodically transmits the use state to the information management system 200 and the access management unit 240 receives the use state. For example, the following use states are considered.

(a) An identifier of a connection source area, that is, an identifier of a WiFi connection point when the portable terminal 300 is connected to the information management system 200 through wireless communication (for example, WiFi).

(b) A communication state (whether communication is established, radio intensity, and the like) between the portable terminal 300 and the information management system 200.

(c) An operation history on the portable terminal 300.

(FIG. 3: Step S306)

The access management unit 240 determines whether the use state of the portable terminal 300 received in S305 is authorized. A check rule used for the determination will be described below. When the use state is authorized, the process returns to S305. When the use state is unauthorized, the process proceeds to S307. When the use state is authorized, the user can continuously use the service with the access right level being maintained.

(FIG. 3: Steps S307 to S309)

The access management unit 240 performs at least one of operations of issuing a warning to the administrator (S308) or lowering the access right level of the user (S309) by a check rule (S307) through a manual operation of the administrator or an automated process. When the access right level is automatically lowered, the administrator may be notified of the execution. After the access right level is lowered, only information accessible according to the lowered access right level is provided to the portable terminal 300. Until the user logs in again to the information management system 200, the access right level is not recovered (in other words, the access right level is recovered when the user logs in again). After S308 or S309, the process returns to S305.

(FIG. 3: Step S309: Supplement)

The lowering of the access right level means that a range of the accessible information is narrowed. However, even after the access right level is lowered in the current step, it is not necessary to ban access to all the services (that is, all pieces of information regarding the automated analyzer 100) provided by the information management system 200. For example, the access right level may be lowered to an access right level at which access to only information excluding personal information of a subject is possible. Accordingly, even when the user does not re-log in, at least part of the information can be continuously accessed, and thus it is possible to maintain user convenience.

(FIG. 3: Step S310)

When the user performs a logout operation on the portable terminal 300 or turns off power of the portable terminal 300, the access management unit 240 deletes information regarding association stored in S303 from the storage medium 250. Accordingly, the user enters the logout state from the information management system 200.

FIG. 4 is a diagram illustrating examples of data and configurations of data tables retained in the storage medium 250. The storage medium 250 stores a login information table, a portable terminal table, an information item table, and an access right table.

The login information table is a data table in which the login-related information and the management right of the user in S301 are retained. As authentication information, a face, voiceprint authentication, or the like may be used in addition to a password. A plurality of people can also use the same user ID. A user ID or a password used to log in to the automated analyzer 100 may be reused in the table, or may be separately defined.

The portable terminal table is a data table in which a use situation of the portable terminal 300 in S305 is retained. In the portable terminal table, an ID of the portable terminal 300 and a user ID using the terminal are associated to be retained as one record. Accordingly, it is possible to retain association information in S303.

The information item table is a data table managing which information items are to be provided to each user. Information items to be provided to each user are regulated according to the access right table to be described below as a principle. When an access right is granted to only information regarding a specific model of the automated analyzer 100 or a specific laboratory, the specification is defined in the table. In the drawing, an O mark indicates a providable information item and an X mark indicates an unprovidable information item. The service providing unit 230 provides only information items permitted to be provided in the table to the portable terminal 300 (that is, a user using the terminal). In the table, it is not necessary to retain information that can be derived in the access right table. However, for convenience of the process, it is assumed that accessible information items are aggregated and defined on the table.

The access right table is a data table in which an access right for each information item (a range of accessible information items) is defined. For one service provided by the information management system 200, a plurality of information items are provided in some cases. An access right to each information item is defined in the table in addition to classification of the service provided to the user. The access right is defined, for example, for each management right of the user (a role of the user). An accessible range of each information item differs for each access right. For example, only the administrator can edit a condition of everyone in a condition editing service, but other users can refer to only own conditions. As such, a use purpose of the portable terminal 300 is different for each manager.

Although not illustrated in FIG. 4, a provision service table in which classification of a service provided to each user is listed, a user schedule table in which a work schedule of each user is recorded, and the like may be stored in the storage medium 250.

FIG. 5A is a diagram illustrating examples of determination conditions and options configured in check rules used when it is determined in S306 whether a use situation of the portable terminal 300 is authorized. When a use situation of the portable terminal 300 matches a use situation designated from options as a determination condition, it can be determined that the use situation is unauthorized. As the determination condition, one or more of the following conditions can be designated.

(Online condition) Whether connection between the portable terminal 300 and the information management system 200 is established, and a duration time of an offline state.

(Access state) A duration time passing without access of the portable terminal 300 to information on the information management system 200 (or information downloaded from the information management system 200 to the portable terminal 300).

(Area condition) An area number indicating access of the portable terminal 300 to the information management system 200 from a certain area in a communication area formed in a space where the automated analyzer 100 is installed, for example, an identifier of a WiFi access point.

(Terminal condition) An ID for individually identifying the portable terminal 300, and whether any terminal logged in by the same user using a plurality of terminals is located at a position distant from other terminals as an option.

(User condition) An ID for individually identifying a user.

(User state) A work schedule of a user, that is, work assumed to be performed by the user.

(Operation state) A service of the information management system 200 used with the portable terminal 300, that is, classification of information regarding the automated analyzer 100 provided to the portable terminal 300 by the information management system 200. In the example illustrated in FIG. 5A, a service providing the information items themselves described in FIG. 4, a service presenting the information items during provision of the service, and the like are mixed, and any service corresponds to classification of an information item.

For example, even when any terminal is used for a specific user, a check rule indicating that connection to the information management system 200 is permitted from only a specific WiFi area is assumed. Here, IDs of banned areas other than areas permitted under the area condition are listed, IDs of all the terminals under the terminal condition are listed, and an ID of the specific user is designated under the user condition.

FIG. 5B is a diagram illustrating examples of options of processes performed when a situation of unauthorized use of the portable terminal 300 is detected. As countermeasures executed when detecting unauthorized situation, processes performed in the portable terminal 300 and processes performed in the information management system 200 (an administrator terminal is also notified of the result) can be given as examples. Examples of the processes in the portable terminal 300 will be described below. As the processes performed in the information management system 200, display of a warning on the administrator terminal or lowering of an access right level of a user, as described in S307 to S309, can be given as examples. Notification to the portable terminal 300 can also be considered.

FIG. 5C is a diagram illustrating examples of actually configured check rules using the options of FIGS. 5A and 5B. A rule of a facility A is an example in which use of the information management system 200 through the portable terminal 300 in an offline state is completely banned. In the current rule, an access right level is lowered unconditionally in the offline state. A rule of a facility B is an example of a rule in which an access right level is maintained when there are many areas where communication is disabled in a range in which a laboratory technician acts and an authorized operation continues. A rule of a facility C is an example in which a strict rule is applied to only the portable terminal 300 used by a staff other than a laboratory technician in a facility where various staffs such as part-time workers other than laboratory technicians work.

A rule example of the facility A is a strict rule in which all the terminals in an offline state are banned. When such a strict access restriction is imposed, there is a case unsuitable for an actual situation of an operation of the facility. Here, like the rule examples of the facilities B and C, a rule of which strictness is alleviated may be used.

In addition to the above, a detailed rule can be designated for a specific user according to a use purpose, such as not authorizing a patient information operation other than specimen information confirmation when alert occurs. When one person can use a plurality of portable terminals 300, an alert may be issued if there is a difference between use areas of the plurality of terminals. Accordingly, countermeasures can be made when any portable terminal 300 that is simultaneously used is misplaced. For example, when a smartwatch and a smartphone are used and only the smartphone is misplaced, use situations exceed thresholds and are deviated between the equipped smartwatch and smartphone, and thus it is possible to detect an unauthorized situation.

The information management system 200 receives instruction inputs of designating the check rules through the user input reception unit 220 and stores content of the input instruction in the storage medium 250. In S306, the access management unit 240 determines whether a use situation of the portable terminal 300 is authorized according to the check rules.

Figure 6:
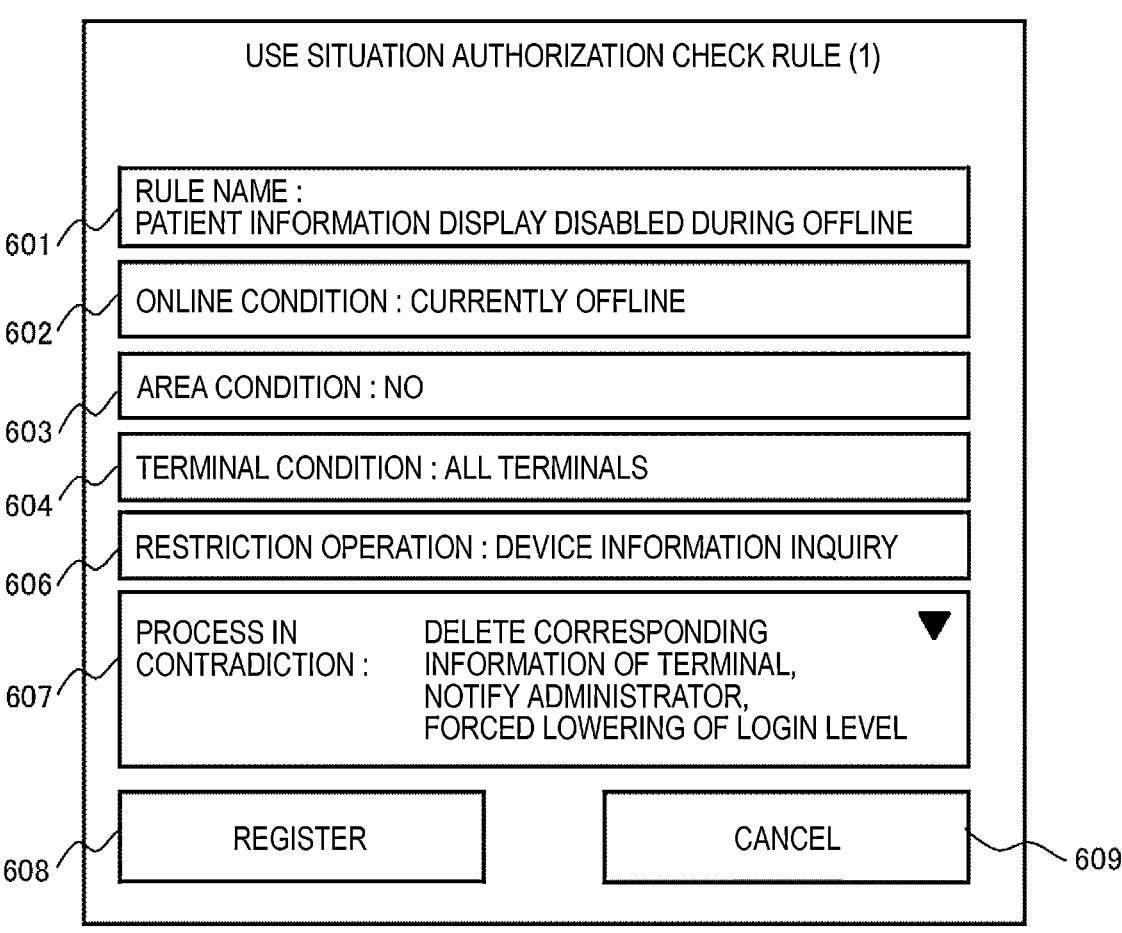
FIG. 6 is a diagram illustrating an example of a screen interface in which the check rules are input.

FIG. 6 is a diagram illustrating an example of a screen interface in which the check rules are input. The user input reception unit 220 receives the check rules described in FIGS. 5A to 5C through the screen interface of FIG. 6. A rule name 601 is a field in which a name of a check rule is input. An online condition 602, an area condition 603, a terminal condition 604, a restriction operation 606 (operation state), and a process in contradiction (a process executed when detecting unauthorized situation) correspond to the check rules described in FIGS. 5A to 5C. FIG. 6 illustrates an example in which only some of the rule items described in FIGS. 5A to 5C are used, but items included in a rule may be added or deleted freely.

FIG. 7 is a diagram illustrating a management screen of the information management system 200. The access management unit 240 presents the management screen of FIG. 7 on a display device such as a display. The following information is presented for each ID of the portable terminal 300 on the management screen.

(Online situation) Whether the portable terminal 300 and the information management system 200 are connected and an ID of the connection source area when connected.

(Login situation) An ID of a user using the terminal and work content that is assumed to be performed by the user currently.

(Access right) An access right level of the user.

(Latest use history) A latest operation history of the user using the information management system 200 (that is, information regarding the latest accessed automated analyzer 100).

The access management unit 240 attracts attention of the administrator, for example, by highlighting and displaying the portable terminal 300 (a thick line range of FIG. 7) on the management screen when a situation of unauthorized use is detected according to a check rule. When a highlighted item is selected by the administrator, the access management unit 240 can prompt the administrator to give specific countermeasures by presenting a screen of FIG. 8.

FIG. 8 is a diagram illustrating an example of a screen interface for giving an instruction for countermeasures to the portable terminal 300 of which a use situation is unauthorized. When there is a setting in which a warning is issued to the administrator when detecting unauthorized situation in a check rule, the access management unit 240 displays a use situation of the portable terminal 300 on the administrator terminal through a notification screen illustrated in an example of FIG. 8. When the administrator selects "Yes", the access right level of the terminal is lowered and information regarding the terminal is deleted from the portable terminal table. Accordingly, the terminal enters a logout state from the information management system 200. Depending on the setting of the check rule, at least one of operations of lowering the access right level of the terminal by force when an unauthorized situation occurs or causing the terminal to log out may be performed although the administrator does not perform a manual operation.

First Embodiment: Conclusion

When a situation of unauthorized use of the portable terminal 300 is detected, the information management system 200 according to the first embodiment performs at least one of the operations of issuing a warning indicating the detection or lowering the access right level of the portable terminal 300. Even when the access right level is lowered, it is not necessary to ban access to all the services of the information management system 200 (that is, all pieces of information regarding the automated analyzer 100) and some of the services may be continuously available. Accordingly, it is possible to achieve guarantee of both security of information regarding the automated analyzer 100 and maintenance of user convenience.

The information management system 200 according to the first embodiment sets a determination criterion appropriate for an actual situation of a facility or the like in which the automated analyzer 100 is installed and countermeasures executed when detecting unauthorized situation, as exemplified in FIGS. 5A to 5C, as the check rule used when a situation of unauthorized use of the portable terminal 300 is detected. Accordingly, it is possible to perform security management appropriate for a facility.

Second Embodiment

In the first embodiment, the example in which the information management system 200 maintains information security by lowering the access right level of the user has been described. On the other hand, even when communication between the portable terminal 300 and the information management system 200 is disconnected, information retained by the information management system 200 is downloaded to the portable terminal 300 so that the portable terminal 300 can be continuously used, and the downloaded information can be continuously used in some cases even when the portable terminal 300 is offline. Here, a problem is how security of the information downloaded to the portable terminal 300 is guaranteed. In a second embodiment of the present invention, one example of countermeasures against the security problem will be described. The configurations of the information management system 200, the portable terminal 300, and the automated analyzer 100 are the same as those of the first embodiment.

Figure 9:
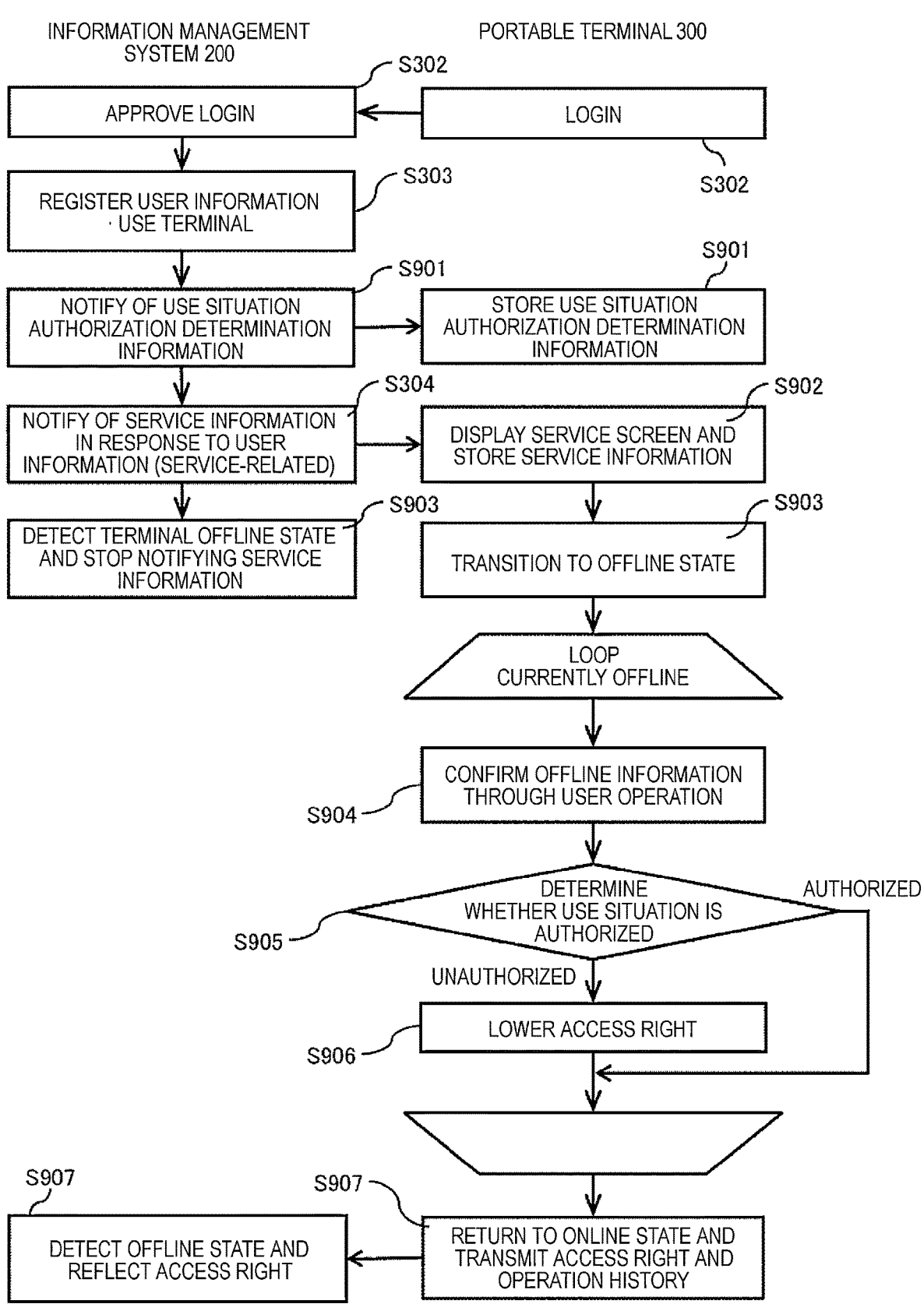
FIG. 9 is a diagram illustrating a processing procedure when communication between the portable terminal 300 and the information management system 200 is disconnected.

FIG. 9 is a diagram illustrating a processing procedure when communication between the portable terminal 300 and the information management system 200 is disconnected. Steps similar to those of FIG. 3 are denoted by the same reference numerals and description thereof will be omitted. It is assumed that S301 is already performed.

(FIG. 9: Step S901)

The access management unit 240 transmits information (for example, a user ID) for identifying a user and information (the check rules described in FIGS. 5A to 5C) for determining whether the use situation of the portable terminal 300 is authorized to the portable terminal 300. The access management unit 340 stores the information in the storage medium 320.

(FIG. 9: Step S902)

The current step is substantially similar to S304, but a process in the portable terminal 300 is different from that of the first embodiment. The computer 310 stores information regarding the automated analyzer 100 in the storage medium 320 whenever the information is acquired from the information management system 200. Accordingly, even when communication between the portable terminal 300 and the information management system 200 is disconnected, the user can continue the operation in an offline state.

(FIG. 9: Step S903)

When communication between the portable terminal 300 and the information management system 200 is disconnected, the information management system 200 detects the disconnection. For example, when communication from the portable terminal 300 to the information management system 200 does not continue for a predetermined time or more, it can be determined that the communication is disconnected. While the communication with the portable terminal 300 is disconnected, the service providing unit 230 does not provide a service to the portable terminal 300 (does not provide information regarding the automated analyzer 100).

(FIG. 9: Steps S904 to S906)

The user refers to the information acquired from the information management system 200 on the portable terminal 300 (S904). The access management unit 340 determines whether the use situation of the portable terminal 300 is authorized according to the check rule acquired from the information management system 200 in S902 (S905). When it is detected that the use situation is unauthorized, the access management unit 340 lowers the access right level of the user as in S309 and deletes all data in which an access right is necessary from the storage medium 320 (S906).

(FIG. 9: Step S906: Supplement)

When the data in which the access right is necessary is deleted from the storage medium 320, the access right level of the user on the portable terminal 300 becomes substantially the same as a case in which the access right level is lowered on the information management system 200. This is because a range of information items which can be accessed by the user is narrowed. The range of the information items that is deleted may be determined according to an accessible range after the access right level on the information management system 200 is lowered according to the check rule acquired from the information management system 200. (FIG. 9: Step S907)

When the portable terminal 300 and the information management system 200 are reconnected, the access management unit 340 transmits a current access right level of the user and an operation history of the portable terminal 300 during offline to the information management system 200. The access management unit 240 detects the reconnection of the portable terminal 300 by the notification. The access management unit 240 reflects the notified access right level. When the access right level is not lowered in S905 and S906, the user can continuously use the service at the same access right level as the access right level before the disconnection of the communication. When the access right level is lowered in S905 and S906, the lowered access right level is maintained until the user logs in again to the information management system 200. (FIG. 9: Step S907: Supplement)

When the communication between the portable terminal 300 and the information management system 200 is disconnected, the access management unit 240 lowers the access right level of the user by the check rule in some cases. Conversely, when the access right level is not lowered in S905 and S906, the portable terminal 300 notifies the information management system 200 of the original access right level in S907 so that the access right level is not lowered. That is, the access right level on the side of the information management system 200 is different from the access right level on the side of the portable terminal 300. In the information management system 200, since the access right level reported by the portable terminal 300 is trusted, there is concern about security to some extent. However, the information management system 200 is operated in an environment in which the automated analyzer 100 is installed, and thus the concern is limited as long as the information management system 200 is operated in the same environment. Accordingly, in the present invention, it is assumed that convenience is preferred and a process is performed as in S907.

Second Embodiment: Conclusion

The information management system 200 according to the second embodiment downloads the information regarding the automated analyzer 100 to the portable terminal 300, and thus the information can be continuously viewed even when the portable terminal 300 is in an offline state. When the unauthorized use situation is detected during offline, the access management unit 340 deletes the information downloaded to the portable terminal 300, and thus substantially lowers the access right level on the terminal. Accordingly, it is possible to maintain information security of the automated analyzer 100 through the portable terminal 300 in consideration of convenience during offline.

When an unauthorized use situation occurs on the portable terminal 300 during the offline state of the portable terminal 300, the information management system 200 according to the second embodiment lowers the access right level on the portable terminal 300 and notifies the information management system 200 of the lowered access right level when communication is recovered. The information management system 200 reflects the notified access right level in the terminal. Accordingly, even when the check rule for lowering the access right level is not formed in the information management system 200 during disconnection of communication, the portable terminal 300 detects the unauthorized use situation by itself, and thus the information security can be maintained.

When an unauthorized use situation does not occur on the portable terminal 300 during the offline state of the portable terminal 300, in the information management system 200 according to the second embodiment, the access right level at the time of login is maintained on the portable terminal 300 and the information management system 200 is notified of the access right level when communication is recovered. The information management system 200 reflects the notified access right level in the terminal. Accordingly, even when the access right level in the information management system 200 is lowered during disconnection of the communication, labor of the re-login of the user to recover the access right level can be omitted as long as the usage of the portable terminal 300 is authorized.

Modified Example of Present Invention

In the foregoing embodiments, the device information acquisition unit 210, the user input reception unit 220, the service providing unit 230, the access management unit 240, and the access management unit 340 can be configured by hardware such as a circuit device mounted with the functions or can also be configured by causing an arithmetic unit to execute software mounted with the functions. The access management unit 340 can be implemented as a dedicated module (which may be any one of hardware and software) implementing the processes of transmitting and receiving data according to the foregoing embodiments between the portable terminal 300 and the information management system 200.

In the foregoing embodiments, a multi-item chemical analyzer that analyzes a plurality of requested items of a specimen according to a photometry scheme can be given as an example of the automated analyzer 100. However, the present invention is not limited thereto and the present invention can be applied to various automated analyzers that treat samples such as patient specimens.

REFERENCE SIGNS LIST

100: automated analyzer
1: specimen container
2: specimen movement mechanism
3: microcomputer
4: interface
5: specimen dispenser
6: liquid level detector
7: reagent dispenser
8: reaction container movement mechanism
9: liquid level detector
10: reagent container
11: reaction container
12: display device
13: input device (mouse, keyboard, or the like)
14: reagent ID reader
15: storage medium
16: memory area
17: reagent storage
18: printer

13

19: specimen ID reader
200: information management system
210: device information acquisition unit
220: user input reception unit
230: service providing unit
240: access management unit
250: storage medium
300: portable terminal
310: computer
320: storage medium
330: display device
340: access management unit
350: user input reception unit

The invention claimed is:

1. An information management system that provides data describing information regarding an automated analyzer analyzing a sample to a remote terminal, the information management system comprising:

a server configured to manage an access right of a user accessing the information using the remote terminal, wherein the server includes an access management unit that detects occurrence of communication disconnection between the remote terminal and the server or a situation of unauthorized use of the remote terminal, when the communication disconnection or the situation of the unauthorized use is detected, the access management unit performs at least one of operations of issuing a warning to an administrator of the information management system, and lowering an access right of the remote terminal to the information from a first access right level before the communication disconnection or the situation of the unauthorized use to a second access right level lower than the first access right level, wherein in the second access right level, a range accessible to the information is narrower than a range of the first access right level, the second access right level is configured to be accessible to at least part of the information, the server includes a storage unit that stores access right data defining a first range of the information accessible at the first access right level and a second range of the information accessible at the second access right level, the access management unit lowers an access right of the remote terminal from the first access right level to the second access right level when the communication disconnection is detected, and the access management unit denies access to the first range and permits access to the second range when access to the information is requested without re-login of the remote terminal to the server after the communication disconnection is detected.

2. The information management system according to claim 1, wherein the access management unit permits the access to the first range when the remote terminal re-logs in and requests the server to access the information after the communication disconnection is detected.

3. The information management system according to claim 2, wherein the access right data defines an access right in a combination of a role of the user and classification of the information provided by the server, and

the access management unit grants an access right corresponding to the role of the user for each combination when the user logs in the server using the remote terminal.

4. The information management system according to claim 1, wherein the server further includes an input reception unit that receives a designation input of designating a check rule describing a determination criterion for detecting that the situation of the unauthorized use occurs, the input reception unit provides a check rule input screen used to input the designation input, and the check rule input screen is configured to input, as a determination condition configuring the check rule, at least one of whether connection between the remote terminal and the server is established, a duration time passing without access of the remote terminal accessing the information, whether the remote terminal accessed the server from one of areas formed in a space where the automated analyzer is installed, an identifier (ID) for individually identifying the remote terminal, an identifier (ID) for individually identifying the user, a work schedule of the user, and classification of the information provided by the server.

5. The information management system according to claim 4, wherein the check rule input screen is configured to input the designation input of designating to perform at least one of operations of issuing the warning or lowering the access right for each combination of the determination condition, and the access management unit performs at least one of the operations of issuing the warning or lowering the access right according to the designation by the designation input.

6. The information management system according to claim 1, wherein the access management unit determines that the situation of the unauthorized use occurs when the same user simultaneously logs in the server using first and second remote terminals and a distance between positions of the first and second remote terminals exceeds a threshold.

7. The information management system according to claim 1, wherein the access management unit presents the user who is logging in the server using the remote terminal and a list indicating whether the communication disconnection or the situation of the unauthorized use occurs for each user on the server, the access management unit provides a countermeasure input screen for inputting a countermeasure taken by designating a user on the list for whom the communication disconnection or the situation of the unauthorized use occurs among the users on the list, and the access management unit takes the countermeasure input on the countermeasure input screen for the user designated on the list.

8. The information management system according to claim 1, wherein the access management unit acquires, as a state of the remote terminal from the remote terminal, at least one of a connection source area of the remote terminal when the remote terminal accesses the server through wireless communication, a communication state between the remote terminal and the server, and an operation history in the remote terminal, and the access management unit detects the situation of the unauthorized use according to the acquired state of the remote terminal.

9. The information management system according to claim 1, wherein the remote terminal downloads the information from the server and stores the information in the remote terminal, and the remote terminal presents the information downloaded from the server on the remote terminal even while communication between the remote terminal and the server is disconnected.

10. The information management system according to claim 9, wherein the remote terminal includes a terminal access management unit that detects the situation of the unauthorized use, and the terminal access management unit lowers the access right of the remote terminal to the information to a level equal to the second access right level by deleting at least part of the information downloaded from the server from the remote terminal when the situation of the unauthorized use is detected while communication between the remote terminal and the server is disconnected.

11. The information management system according to claim 10, wherein the terminal access management unit acquires a check rule for detecting occurrence of the situation of the unauthorized use from the server, and the terminal access management unit detects the situation of the unauthorized use according to the check rule.

12. The information management system according to claim 9, wherein the remote terminal includes a terminal access management unit that detects the situation of the unauthorized use, the terminal access management unit lowers the access right of the remote terminal to the information downloaded from the server to the remote terminal to a level equal to the second access right level when the situation of the unauthorized use is detected during the disconnection of the communication between the remote terminal and the server, the terminal access management unit notifies the server of the lowered access right level when the communication between the remote terminal and the server is recovered, and the access management unit controls the access right of the remote terminal to the information according to the access right level received through the notification.

13. The information management system according to claim 9, wherein the remote terminal includes a terminal access management unit that detects the situation of the unauthorized use, the terminal access management unit maintains an access right to the information downloaded from the server to the remote terminal to a level equal to the level before disconnection of the communication when the situation of the unauthorized use is not detected while communication between the remote terminal and the server is disconnected, the terminal access management unit notifies the server of the maintained access right level when the communication between the remote terminal and the server is recovered, and the access management unit controls the access right of the remote terminal to the information according to the access right level received through the notification.

14. An information management method of managing information regarding an automated analyzer analyzing a sample to a remote terminal using an information management system that provides data describing the information, the information management method comprising:

a step of managing an access right of a user accessing the information using the remote terminal, wherein the step of managing the access right includes a step of detecting occurrence of communication disconnection between the remote terminal and the information management system or a situation of unauthorized use of the remote terminal, when the communication disconnection or the situation of the unauthorized use is detected in the step of detecting the occurrence, at least one of operations of issuing a warning to an administrator of the information, and lowering an access right of the remote terminal to the information from a first access right level before the communication disconnection or the situation of the unauthorized use to a second access right level lower than the first access right level, is performed, wherein in the second access right level, a range accessible to the information is narrower than a range of the first access right level, and the second access right level is configured to be accessible to at least part of the information, the information management system includes a storage unit that stores access right data defining a first range of the information accessible at the first access right level and a second range of the information accessible at the second access right level, in the step of managing the access right, an access right of the remote terminal is lowered from the first access right level to the second access right level when the communication disconnection is detected, and in the step of managing the access right, access to the first range is denied and access to the second range is permitted when access to the information is requested without re-login of the remote terminal to the information management system after the communication disconnection is detected.

* * * * *